(12) United States Patent
Wee et al.

(10) Patent No.: US 10,698,145 B2
(45) Date of Patent: Jun. 30, 2020

(54) POLARIZING PLATE AND OPTICAL DISPLAY COMPRISING THE SAME

(71) Applicant: Samsung SDI Co., Ltd., Yongin-si, Gyeonggi-do (KR)

(72) Inventors: Dong Ho Wee, Suwon-si (KR); Jeong Ho Lee, Suwon-si (KR); Kyoung Min Cho, Suwon-si (KR); Jang Hyun Cho, Suwon-si (KR); Young Oh, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 109 days.

(21) Appl. No.: 16/125,266

(22) Filed: Sep. 7, 2018

(65) Prior Publication Data

US 2019/0072698 A1   Mar. 7, 2019

(30) Foreign Application Priority Data

Sep. 7, 2017   (KR) .................. 10-2017-0114818

(51) Int. Cl.
  *G02B 5/30* (2006.01)
  *G02B 1/04* (2006.01)
  (Continued)

(52) U.S. Cl.
  CPC .............. *G02B 5/3033* (2013.01); *G02B 1/04* (2013.01); *G02B 1/14* (2015.01); *G02F 1/133502* (2013.01); *G02F 1/133528* (2013.01)

(58) Field of Classification Search
  CPC .......... G02B 5/3033; G02B 1/14; G02B 1/04; G02F 1/133502; G02F 1/133528
  See application file for complete search history.

(56) References Cited

U.S. PATENT DOCUMENTS

2016/0252665 A1* 9/2016 Lee .................. G02B 5/305
                                                    359/489.07

FOREIGN PATENT DOCUMENTS

| JP | 2006-251659 A | 9/2006 |
| JP | 2012-118201 A | 6/2012 |

(Continued)

OTHER PUBLICATIONS

Korean Office action dated Jun. 18, 2019 in corresponding Korean Application No. 10-2017-0114818 (6 pgs.).

*Primary Examiner* — Wen Huang
(74) *Attorney, Agent, or Firm* — Lewis Roca Rothgerber Christie LLP

(57) ABSTRACT

A polarizing plate includes: a polarizing film; and an optical film on a surface of the polarizing film, the optical film including a first resin layer and a second resin layer sequentially stacked on the polarizing film, wherein the second resin layer has a higher index of refraction than the first resin layer, a plurality of pattern groups is at an interface between the first resin layer and the second resin layer, each of the pattern groups including at least two embossed optical patterns protruding from the second resin layer and a flat section between adjacent embossed optical patterns, each of the first surfaces being a bottom portion of each of the embossed optical patterns, and, in each pattern group, shortest distances between the first surfaces of the embossed optical patterns and the flat sections immediately adjacent to the embossed optical patterns are sequentially increased, or sequentially decreased.

20 Claims, 3 Drawing Sheets

(51) Int. Cl.
*G02B 1/14* (2015.01)
*G02F 1/1335* (2006.01)

(56) References Cited

FOREIGN PATENT DOCUMENTS

JP   2013-061430 A    4/2013
KR   10-2009-0006451 A   1/2009
WO   WO 2017/100033 A1   6/2017

\* cited by examiner

Normalized $I^2$ $y=0.9264e^{-0.008x}$
$R^2=0.987$

Normalized $I^2$ $y=0.7282e^{-0.005x}$
$R^2=0.8696$

POLARIZING PLATE AND OPTICAL DISPLAY COMPRISING THE SAME

CROSS-REFERENCE TO RELATED APPLICATION

This application claims priority to and the benefit of Korean Patent Application No. 10-2017-0114818, filed on Sep. 7, 2017 in the Korean Intellectual Property Office, the entire disclosure of which is incorporated herein by reference.

BACKGROUND

1. Field

Aspects of embodiments of the present invention relate to a polarizing plate and an optical display including the same.

2. Description of Related Art

A liquid crystal display is operated to emit light through a liquid crystal panel after receiving the light from a backlight unit. Thus, the liquid crystal display provides a good front contrast ratio (CR). However, the liquid crystal display has a poor side contrast ratio. Therefore, it is desirable that the side contrast ratio of the liquid crystal display be increased while minimizing or reducing reduction in the front contrast ratio thereof in order to improve visibility.

A liquid crystal display may also be maintained in a non-driven state. In addition, the liquid crystal display can be displayed in a driven state or in a non-driven state for the purpose of product demonstration or product sales. When a screen of the liquid crystal display in a non-driven state receives external light, rainbow spots or mura can be generated on the screen or reflected light can be split, thereby causing deterioration in black visibility and appearance of the liquid crystal display. Black visibility refers to the degree of black on the screen of the liquid crystal display in a non-driven state.

Therefore, there is a need for a polarizing plate which can improve both front contrast ratio and side contrast ratio of a liquid crystal display upon operation while preventing or substantially preventing deterioration in appearance when the liquid crystal display is turned off.

One example of the background technique is disclosed in Japanese Unexamined Patent Publication No. 2006-251659.

SUMMARY

According to an aspect of embodiments of the present invention, a polarizing plate is capable of preventing or substantially preventing deterioration in external appearance of a screen of an optical display caused by external light upon non-operation of the optical display.

According to another aspect of embodiments of the present invention, a polarizing plate is capable of preventing or substantially preventing generation of mura on a screen of an optical display caused by external light while improving black visibility upon non-operation of the optical display.

According to another aspect of embodiments of the present invention, a polarizing plate is capable of improving both front contrast ratio and side contrast ratio and capable of improving the side contrast ratio while reducing or minimizing reduction in front contrast ratio upon operation of an optical display.

In accordance with one or more embodiments of the present invention, a polarizing plate includes: a polarizing film; and an optical film on a surface of the polarizing film, the optical film including a first resin layer and a second resin layer sequentially stacked on the polarizing film, wherein the second resin layer has a higher index of refraction than the first resin layer, a plurality of pattern groups is at an interface between the first resin layer and the second resin layer, each of the pattern groups including at least two embossed optical patterns protruding from the second resin layer and a flat section between adjacent embossed optical patterns, the flat sections or first surfaces of the embossed optical patterns are collinear at the interface between the first resin layer and the second resin layer, each of the first surfaces being a bottom portion of each of the embossed optical patterns, and, in each pattern group, shortest distances between the first surfaces of the embossed optical patterns and the flat sections immediately adjacent to the embossed optical patterns are sequentially increased, or sequentially decreased.

In one or more embodiments, the flat sections may be collinear with each other.

In one or more embodiments, the first surfaces of the embossed optical patterns may be collinear with each other.

In one or more embodiments, the pattern groups may include an $m^{th}$ pattern group and an $(m+1)^{th}$ pattern group, wherein, in the $m^{th}$ pattern group, the shortest distances are sequentially decreased, and in the $(m+1)^{th}$ pattern group, the shortest distances are sequentially decreased, respectively.

In one or more embodiments, the pattern groups may include an $m^{th}$ pattern group and an $(m+1)^{th}$ pattern group, wherein, in the $m^{th}$ pattern group, the shortest distances are sequentially increased, and in the $(m+1)^{th}$ pattern group, the shortest distances are sequentially increased, respectively.

In one or more embodiments, in each pattern group, a ratio of a maximum value to a minimum value among heights of the embossed optical patterns (maximum value/minimum value) may be greater than about 1 and less than about 5.

In one or more embodiments, the pattern groups may include an $m^{th}$ pattern group and an $(m+1)^{th}$ pattern group, wherein a maximum height of an $i^{th}$ optical pattern in the $m^{th}$ pattern group may be the same as or different from a maximum height of an $i^{th}$ optical pattern in the $(m+1)^{th}$ pattern group, i being an integer from 1 to 10.

In one or more embodiments, each of the first surfaces may be a planar surface.

In one or more embodiments, each of the embossed optical patterns may have a rectangular, square, or trapezoidal cross-sectional shape.

In one or more embodiments, in each pattern group, a pitch is greater than 1 to about 5 times a maximum width of the optical pattern.

In one or more embodiments, a difference in index of refraction between the second resin layer and the first resin layer may be about 0.3 or less.

In one or more embodiments, the embossed optical pattern may protrude from the second resin layer in an opposite direction with respect to a light exiting direction of the polarizing film.

In one or more embodiments, an aspect ratio of an embossed optical pattern having the largest height in each pattern group may be greater than about 0.3 and less than or equal to about 3.

In one or more embodiments, the polarizing plate may further include a first protective layer on a surface of the second resin layer.

In accordance with another aspect of embodiments of the present invention, an optical display includes the polarizing plate according to the present invention.

DETAILED DESCRIPTION

Figure 1:
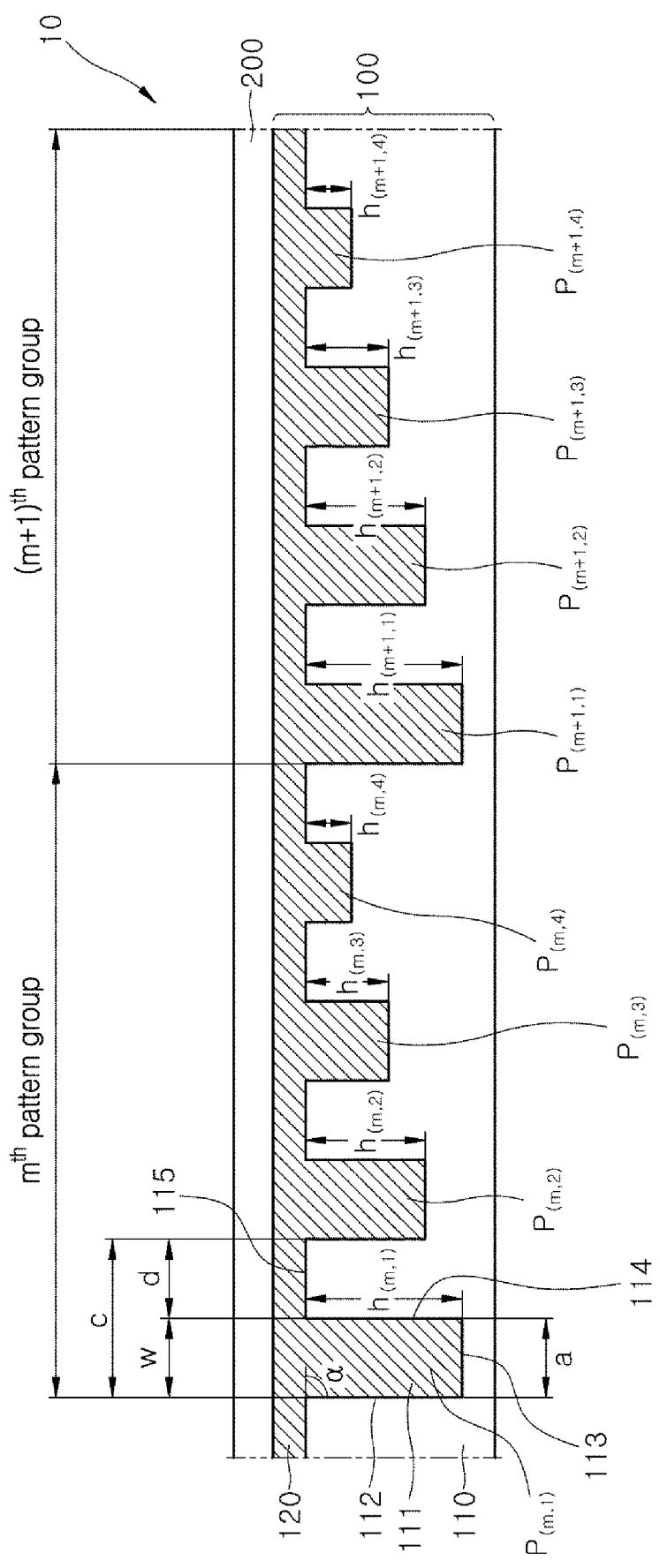
FIG. 1 is a cross-sectional view of an optical film of a polarizing plate according to an embodiment of the present invention.

Some embodiments of the present invention will be described in further detail with reference to the accompanying drawings to provide a thorough understanding of the invention to those skilled in the art. It should be understood that the present invention may be embodied in different ways and is not limited to the following embodiments. In the drawings, portions irrelevant to the description may be omitted for clarity. Like components are denoted by like reference numerals throughout the specification.

Herein, spatially relative terms such as "upper" and "lower" are defined with reference to the accompanying drawings. Thus, it is to be understood that the term "upper surface" can be used interchangeably with the term "lower surface," and when an element, such as a layer or a film, is referred to as being placed "on" another element, it may be directly placed on the other element, or one or more intervening elements may be present. On the other hand, when an element is referred to as being placed "directly on" another element, there are no intervening elements therebetween.

Herein, the terms "horizontal direction" and "vertical direction" refer to a longitudinal direction and a transverse direction of a rectangular screen of a liquid crystal display, respectively. Herein, "side" refers to a region in which θ ranges from 60° to 90° in the spherical coordinate system represented by (φ, θ) in which a front side is indicated by (0°, 0°), a left end point is indicated by (180°, 90°), and a right end point is indicated by (0°, 90°) with reference to the horizontal direction.

Herein, the term "bottom portion" refers to the lowest portion in an embossed optical pattern.

Herein, "aspect ratio" refers to a ratio of maximum height of an optical pattern to maximum width thereof (maximum height/maximum width).

Herein, "pitch" refers to the sum of the maximum width (w) of one optical pattern and the width (d) of one flat section.

Herein, "in-plane retardation (Re)" is a value measured at a wavelength of 550 nm and is represented by Equation A:

$$Re = (nx - ny) \times d, \quad \text{Equation A:}$$

where nx and ny are the indices of refraction in the slow and fast axes of a corresponding protective layer at a wavelength of 550 nm, respectively, and d is the thickness (unit: nm) of the protective layer.

Herein, the term "(meth)acryl" refers to acryl and/or methacryl.

Herein, the term "black visibility" refers to the degree of black on a screen of an optical display upon non-operation without generating mura due to external light. Higher determination coefficient of black visibility indicates better black visibility.

Herein, "determination coefficient of black visibility" was measured on a liquid crystal display manufactured using a polarizing plate, as a viewer side polarizing plate, on which the determination coefficient of black visibility would be measured, with a fluorescent lamp placed at a predetermined height above a screen of the liquid crystal display so as to correspond to the middle location of the screen in the longitudinal direction. In a non-driven state of the liquid crystal display, the fluorescent lamp was turned on to measure the intensity of reflected light on each of pixels obtained by partitioning the screen of the liquid crystal display into pixels. The intensity (I) of the reflected light measured on each pixel was divided by the maximum value of the intensity (I) of the measured reflected light to obtain a squared value in each pixel. A graph was obtained by arranging pixel unit locations on the x-axis and the obtained squared values on the y-axis, and was normalized by a statistical analysis method. From normalization, a trend line and residuals of an exponential function ($y = ae^{bx}$) were obtained. The residuals were used as the determination coefficient of black visibility. A determination coefficient of black visibility approaching 1 indicates better external appearance, and a lower determination coefficient of black visibility means larger fluctuation of the intensity of reflected light providing apparent diffraction light.

The present invention is based on features of a polarizing plate that includes: a polarizing film; and a contrast-improving optical film formed on a surface of the polarizing film, the contrast-improving optical film including a first resin layer and a second resin layer sequentially stacked on the polarizing film, wherein the second resin layer has a higher index of refraction than the first resin layer, a plurality of pattern groups is formed at an interface between the first resin layer and the second resin layer, each of the pattern groups including at least two embossed optical patterns protruding from the second resin layer and a flat section formed between adjacent embossed optical patterns, the flat sections or first surfaces of the embossed optical patterns are collinear at the interface between the first resin layer and the second resin layer, each of the first surfaces being a bottom portion of each of the embossed optical patterns, and, in each pattern group, shortest distances between the first surfaces of the embossed optical patterns and the flat sections immediately adjacent to the embossed optical patterns are sequentially increased, or sequentially decreased.

For example, in each pattern group, when the shortest distances between the first surfaces of first to $i^{th}$ embossed optical patterns and flat sections immediately adjacent to the first to $i^{th}$ embossed optical patterns are sequentially indicated by $h_1, h_2, \ldots, h_i$, respectively, $h_1 < h_2 < \ldots < h_i$ or $h_1 > h_2 > \ldots > h_j$.

When used as a viewer-side polarizing plate, the polarizing plate can improve both front contrast ratio and side contrast ratio and can improve the side contrast ratio while reducing or minimizing reduction in front contrast ratio upon operation of an optical display. In addition, the polarizing plate can prevent or substantially prevent generation of mura on a screen of an optical display caused by external light while improving black visibility upon non-operation of the optical display.

Herein, a polarizing plate according to an embodiment of the present invention will be described with reference to FIG. 1. FIG. 1 is a cross-sectional view of a contrast-improving optical film of a polarizing plate according to an embodiment of the present invention.

The polarizing plate according to an embodiment may include a polarizing film and a contrast-improving optical film formed on a surface (e.g., a light exiting surface) of the polarizing film.

Referring to FIG. 1, the optical film or contrast-improving optical film 10 may include a first protective layer 200 and a contrast-improving layer 100.

The contrast-improving layer 100 may include a first resin layer 110 and a second resin layer 120 directly formed on the first resin layer 110. Herein, the expression "directly formed on" means that no adhesive layer, bonding layer, or optical layer is interposed between the first resin layer and the second resin layer.

Although not shown in FIG. 1, the contrast-improving layer 200 may be stacked on the light exiting surface of the polarizing film in a direct manner or through an adhesive layer. Accordingly, the polarizing plate according to the present invention has a structure in which the first resin layer 110, the second resin layer 120, and the first protective layer 200 are sequentially stacked on the polarizing film. The second resin layer 120 has a higher index of refraction than the first resin layer 110.

A plurality of pattern groups is sequentially arranged at an interface between the first resin layer 110 and the second resin layer 120 in a transverse direction of an embossed optical pattern 111. Each of the pattern groups includes at least two embossed optical patterns 111 protruding from the second resin layer 120; and a flat section 115 formed between adjacent optical patterns 111. There are i embossed optical patterns in each pattern group. There may be i flat sections in each pattern group. Here, i may be an integer from 1 to 10, without being limited thereto. In addition, n pattern groups may be arranged at the interface between the first resin layer 110 and the second resin layer 120, wherein n may vary depending on the overall size of an optical display.

FIG. 1 shows an $m^{th}$ pattern group and an $(m+1)^{th}$ pattern group adjacent thereto. The $m^{th}$ pattern group and the $(m+1)^{th}$ pattern group are sequentially arranged in the transverse direction of the embossed optical pattern.

Referring to FIG. 1, in the $m^{th}$ pattern group, a first optical pattern a second optical pattern $P_{(m,2)}$, a third optical pattern $P_{(m,3)}$, and a fourth optical pattern $P_{(m,4)}$ are sequentially formed in the transverse direction of the embossed optical pattern 111, and a flat section 115 is formed between adjacent embossed optical patterns. When the shortest distances between first surfaces 113 of the first to fourth optical patterns 111 and the flat sections 115 adjacent to the first to fourth optical patterns 111 are indicated by $h_{(m,1)}$, $h_{(m,2)}$, $h_{(m,3)}$, and $h_{(m,4)}$, respectively, $h_{(m,1)} > h_{(m,2)} > h_{(m,3)} > h_{(m,4)}$. Here, the first surface 113 of one optical pattern 111 refers to the lowest surface of the optical pattern 111. In an embodiment, the shortest distances "h" between the first surfaces 113 of the optical patterns 111 and the flat sections 115 adjacent to the respective optical patterns 111 may be about 40 μm or less, and, in an embodiment, about 30 μm or less, and, in an embodiment, about 4 μm to about 15 μm. Within this range of "h," the polarizing plate can improve the contrast ratio, viewing angle, and brightness of an optical display without causing the Moiré phenomenon.

The $(m+1)^{th}$ pattern group is a pattern group adjacent to the $m^{th}$ pattern group. In the $(m+1)^{th}$ pattern group, a first optical pattern $P_{(m+1,1)}$, a second optical pattern $P_{(m+1,2)}$, a third optical pattern $P_{(m+1,3)}$, and a fourth optical pattern $P_{(m+1,4)}$ are sequentially formed in the transverse direction of the embossed optical pattern and a flat section 115 is formed between adjacent embossed optical patterns. When the shortest distances between the first surfaces 113 of the first to fourth optical patterns 111 and the flat sections 115 adjacent to the first to fourth optical patterns 111 are indicated by $h_{(m+1,1)}$, $h_{(m+1,2)}$, $h_{(m+1,3)}$, and $h_{(m+1,4)}$, respectively, $h_{(m+1,1)} > h_{(m+1,2)} > h_{(m+1,3)} > h_{(m+1,4)}$.

Referring to FIG. 1, in an embodiment, the polarizing plate includes an $m^{th}$ pattern group and an $(m+1)^{th}$ pattern group, wherein, in the $m^{th}$ pattern group, the shortest distances are sequentially decreased, and in the $(m+1)^{th}$ pattern group, the shortest distances are sequentially decreased, respectively. In an embodiment, in the $m^{th}$ pattern group, the shortest distances are only sequentially decreased, and in the $(m+1)^{th}$ pattern group, the shortest distances are only sequentially decreased, respectively. For example, the polarizing plate includes an $m^{th}$ pattern group and an $(m+1)^{th}$ pattern group, wherein, in each pattern group, when the shortest distances between the first surfaces of first to $i^{th}$ embossed optical patterns and flat sections immediately adjacent to the first to $i^{th}$ embossed optical patterns are sequentially indicated by $h_1, h_2, \ldots, h_i$, respectively, $h_1 > h_2 > \ldots > h_i$. In this way, when used as a visibility-improving polarizing plate, the polarizing plate can improve black visibility upon non-operation of the optical display.

Although not shown in FIG. 1, the polarizing plate may further include an $(m+2)^{th}$ pattern group. Also in the $(m+2)^{th}$ pattern group, when the shortest distances between the first surfaces of first to $i^{th}$ embossed optical patterns and flat sections immediately adjacent to the first to $i^{th}$ embossed optical patterns are sequentially indicated by $h_1, h_2, \ldots, h_i$, respectively, $h_1 > h_2 > \ldots > h_i$. In other words, the polarizing plate according to the present invention may include at least two, for example, three or more, for example, four to ten pattern groups in which, when the shortest distances between the first surfaces of first to $i^{th}$ embossed optical patterns and flat sections immediately adjacent to the first to $i^{th}$ embossed optical patterns are sequentially indicated by $h_1, h_2, \ldots, h_i$, respectively, $h_1 > h_2 > \ldots > h_i$.

In another embodiment, although not shown in FIG. 1, the pattern groups may include an $m^{th}$ pattern group and an $(m+1)^{th}$ pattern group, wherein, in the $m^{th}$ pattern group, the shortest distances are sequentially increased, and in the $(m+1)^{th}$ pattern group, the shortest distances are sequentially increased, respectively. In an embodiment, in the $m^{th}$ pattern group, the shortest distances are only sequentially increased, and in the $(m+1)^{th}$ pattern group, the shortest distances are only sequentially increased, respectively. For example, in each pattern group, when the shortest distances between the first surfaces of first to $i^{th}$ embossed optical patterns and flat sections immediately adjacent to the first to $i^{th}$ embossed optical patterns are sequentially indicated by $h_1, h_2, \ldots h_i$, respectively, $h_1 < h_2 < \ldots < h_i$. That is, the polarizing plate according to the present invention may include a contrast-improving optical film satisfying $h_{(m,1)} < h_{(m,2)} < h_{(m,3)} < h_{(m,4)}$ and $h_{(m+1,1)} < h_{(m+1,2)} < h_{(m+1,3)} < h_{(m+1,4)}$. The polarizing plate according to the present invention includes an $m^{th}$ pattern group and an $(m+1)^{th}$ pattern group, wherein, in each pattern group, when the shortest distances between the first surfaces of first to $i^{th}$ embossed optical patterns and flat sections immediately adjacent to the first to $i^{th}$ embossed optical patterns are sequentially indicated by $h_1, h_2, \ldots, h_i$, respectively, $h_1 < h_2 < \ldots < h_i$. In this way, when used as a viewer-side polarizing plate, the polarizing plate can improve black visibility upon non-operation of the optical display. The polarizing plate according to the present invention may include at least two, for example, three or more, for example, four to ten pattern groups in which, when the shortest distances between the first surfaces of first to $i^{th}$ embossed optical patterns and flat sections immediately adjacent to the first to $i^{th}$ embossed optical patterns are sequentially indicated by $h_1, h_2, \ldots, h_i$, respectively, $h_1 < h_2 < \ldots < h_i$.

In an embodiment, at the interface of the first resin layer 110 and the second resin layer 120, the flat sections 115 may be collinear with each other. Herein, the expression "the flat sections are collinear" means that the distances from the flat sections to one surface of the contrast-improving layer 100 (a lowermost surface of the contrast-improving layer or an interface between the contrast-improving layer and the first protective layer) are all the same.

Referring to FIG. 1, in an embodiment, each of the lowermost surface of the first resin layer 110 and the uppermost surface of the second resin layer 120 is planar. Distances from the lowermost surface of the first resin layer 110 to the flat sections 115 may be all the same, or distances from the uppermost surface of the second resin layer 120 to the flat sections 115 may be all the same. In this way, when used as a viewer-side polarizing plate, the polarizing plate can improve black visibility upon non-operation of an optical display.

In an embodiment, an embossed optical pattern having the largest height in each pattern group may have an aspect ratio of greater than about 0.3 and less than or equal to about 3.0. Within this range, the polarizing plate can improve the side contrast ratio while improving black visibility upon non-operation of the optical display. In an embodiment, an embossed optical pattern having the largest height in each pattern group has an aspect ratio of about 0.5 to about 2.0.

When used as a visibility-improving polarizing plate of an optical display, the polarizing plate allows polarized light from the polarizing film to be diffused through the flat sections while passing through adjacent embossed optical patterns in a driven state of the optical display in which the optical display is turned on, thereby improving the side contrast ratio. On the other hand, in a non-driven state of the optical display in which the optical display is turned off, the polarizing plate allows external light to be diffracted and mixed due to the embossed optical patterns and the flat sections, thereby improving black visibility of a screen of the optical display. The polarizing plate may have a determination coefficient of black visibility of about 0.98 or more, and, in an embodiment, about 0.98 to about 1.000.

The embossed optical patterns 111 protrude from the second resin layer 120 in an opposite direction with respect to a light exiting direction of the polarizing film.

Each of the embossed optical patterns 111 may have the first surface 113 formed at the bottom portion thereof and at least one inclined surface 112; 114 connected to the first surface 113. In FIG. 1, each of the optical patterns is shown as having one planar surface formed at the bottom portion thereof and two inclined planar surfaces to have a rectangular cross-sectional shape. However, it should be understood that the present invention is not limited thereto, and the optical pattern may have an N-sided polygonal shape (N being an integer from 4 to 20), such as a square shape or a trapezoidal shape, in cross-section. In an embodiment, the optical pattern has a rectangular shape, a square shape, or a trapezoidal shape in cross-section.

The first surface 113 is formed at the bottom portion of the embossed optical pattern and can improve viewing angle and brightness by further diffusing light reaching the first surface in an optical display. Thus, the polarizing plate according to this embodiment can improve light diffusion, thereby minimizing or reducing brightness loss. Although FIG. 1 shows the structure wherein the first surface 113 is flat and parallel to the flat section 115, it should be understood that the present invention is not limited thereto and the first surface 113 may have fine unevenness.

In an embodiment, the first surface 113 may have a width "a" of about 0.5 μm to about 30 μm, and, in an embodiment, about 2 μm to about 20 μm. In each pattern group, the first surfaces of the optical patterns may have the same or different widths.

In an embodiment, each of the optical patterns 111 may have a height of about 40 μm or less, and, in an embodiment, about 30 μm or less, and, in an embodiment, about 4 μm to about 15 μm. Within this range, the polarizing plate can improve the contrast ratio, viewing angle, and brightness of an optical display without causing the Moiré phenomenon.

In an embodiment, a ratio of a maximum value to a minimum value among heights of the optical patterns in each pattern group (maximum height/minimum height) may be greater than about 1 and less than about 5, and, in an embodiment, about 1 to about 3. Within this range, the polarizing plate can improve black visibility while improving visibility of an optical display.

In an embodiment, a maximum height of an $i^{th}$ optical pattern in an $m^{th}$ pattern group may be the same as or different from a maximum height of an $i^{th}$ optical pattern in an $(m+1)^{th}$ pattern group. In this way, the polarizing plate can further improve black visibility of an optical display. Here, i is an integer from 1 to 10.

In an embodiment, each of the optical patterns 111 may have a maximum width "w" of 80 μm or less, and, in an embodiment, 50 μm or less, and, in an embodiment, about 5 μm to about 25 μm. Within this range, the polarizing plate can improve the contrast ratio, viewing angle, and brightness of an optical display without causing the Moiré phenomenon. In each pattern group, the optical patterns may have the same or different maximum widths.

In an embodiment, each of the optical patterns 111 may have a base angle α of about 60° to about 90°, and, in an embodiment, about 80° to about 90°. Within this range, the polarizing plate can improve visibility while reducing or minimizing reduction in front contrast ratio. In each pattern group, the optical patterns may have the same or different base angles α. Here, the term "base angle α" refers to an angle formed between the maximum width "w" of each optical pattern 111 and the inclined surface 112 of the optical pattern 111 directly connected to the flat section 115.

In an embodiment, each of the optical patterns may have the same or different base angles α at both sides thereof.

The flat section 115 is formed between adjacent embossed optical patterns 111. Upon receiving light, the flat section 115 allows the light to exit therethrough without optical distortion, thereby minimizing or reducing brightness loss.

In an embodiment, the flat section 115 may have a width "d" of about 80 μm or less, and, in an embodiment, about 50 μm or less, and, in an embodiment, about 5 μm to about 25 μm. Within this range, the polarizing plate can improve the contrast ratio, viewing angle, and brightness of an optical display without causing the Moiré phenomenon. In each pattern group, the flat sections 115 may have the same or different widths.

Herein, a pitch "c" is the sum of the maximum width of one embossed optical pattern and the width of one flat section directly adjoining the optical pattern. The pitch "c" may be about 1 time or more, for example, about 1 to about 5 times, or about 1 to about 2 times, the maximum width "w"

of the corresponding optical pattern. Within this range, the polarizing plate can improve brightness and contrast ratio without causing the Moiré phenomenon. In an embodiment, the pitch "c" may be in a range from about 5 µm to about 500 µm, and, in an embodiment, about 10 µm to about 25 µm. Within this range, the polarizing plate can improve brightness and contrast ratio without causing the Moiré phenomenon. In each pattern group, the pitches with respect to corresponding optical patterns may have the same or different values.

In an embodiment, although not shown in FIG. 1, the optical patterns 111 may be formed in the form of a stripe extending in the longitudinal direction thereof. In this way, the polarizing plate can further improve the side contrast ratio of an optical display.

In an embodiment, the second resin layer 120 has a higher index of refraction than the first resin layer 110. In an embodiment, a difference in index of refraction between the second resin layer 120 and the first resin layer 110 may be about 0.3 or less, and, in an embodiment, about 0.20 or less, and, in an embodiment, about 0.05 to about 0.20, and, in an embodiment, about 0.10 to about 0.15. Within this range, the polarizing plate can allow collected light to be more efficiently diffused while further improving the side contrast ratio of an optical display.

In an embodiment, the second resin layer 120 may have an index of refraction of about 1.50 or more, and, in an embodiment, about 1.50 to about 1.70. Within this range, the contrast-improving layer can provide good light diffusion. In an embodiment, the second resin layer 120 may be formed of a UV-curable or thermally-curable composition including at least one of (meth)acrylic, polycarbonate, silicone, and epoxy resins, without being limited thereto.

In an embodiment, the first resin layer 110 may have an index of refraction of less than about 1.52, and, in an embodiment, about 1.35 to less than 1.50. Within this range, the contrast-improving layer can provide good light diffusion, can be easily fabricated, and can have large effects of diffusing polarized light while improving contrast ratio. In an embodiment, the first resin layer 110 may be formed of a UV-curable or thermally-curable composition including a transparent resin. In an embodiment, the transparent resin may include at least one of (meth)acrylic, polycarbonate, silicone, and epoxy resins, without being limited thereto. The transparent resin may have a light transmittance of about 90% or more after curing.

In an embodiment, the first resin layer 110 may be a non-adhesive layer exhibiting no adhesion. In another embodiment, the first resin layer may be formed of a self-adhesive resin to act as an adhesive/bonding layer which facilitates interlayer bonding or allows elimination of a separate polarizer protection layer upon interlayer bonding, thereby enabling thickness reduction of the polarizing plate. The self-adhesive bonding resin may be an acrylic, epoxy, or urethane resin. If the first resin layer 110 is not self-adhesive, the first resin layer 110 may be bonded to the polarizing film via a bonding layer. The bonding layer may be formed of a water-based bonding agent or a photocurable bonding agent.

The first protective layer 200 is a light transmissive layer and allows diffused light having passed through the second resin layer to pass therethrough in an optical display.

The first protective layer 200 may be a retardation film having a certain range of retardation or an isotropic optical film. In an embodiment, the first protective layer has an Re of about 8,000 nm or more, and, in an embodiment, about 10,000 nm or more, and, in an embodiment, greater than about 10,000 nm, and, in an embodiment, about 10,100 nm to about 15,000 nm. Within this range, the first protective layer can prevent or substantially prevent generation of rainbow spots while further diffusing light diffused through the stacked structure of the second resin layer and the first resin layer. In another embodiment, the first protective layer may be an isotropic optical film having an Re of about 60 nm or less, and, in an embodiment, about 0 nm to about 60 nm, and, in an embodiment, about 40 nm to about 60 nm. Within this range, the first protective layer can provide good image quality through compensation for viewing angle. Herein, the term "isotropic optical film" means a film having substantially the same nx, ny, and nz, and the expression "substantially the same" includes not only the case where nx, ny, and nz are completely the same, but also the case where there is an acceptable margin of error between nx, ny, and nz. In an embodiment, the first protective layer is a retardation film having an Re of about 8,000 nm or more, and, in an embodiment, about 10,000 nm or more, and, in an embodiment, greater than about 10,000 nm.

In an embodiment, the first protective layer 200 may have a thickness of about 30 µm to about 120 µm, and, in an embodiment, about 20 µm to about 80 µm. Within this thickness range, the first protective film can be used for an optical display. The first protective layer 200 may have a light transmittance of about 80% or more, and, in an embodiment, about 85% to about 95%, in the visible range. The first protective layer 200 may be formed by uniaxially or biaxially stretching an optically transparent resin. In an embodiment, the optically transparent resin may include at least one selected from polyester resins including polyethylene terephthalate (PET), polybutylene terephthalate, polyethylene naphthalate, polybutylene naphthalate, and the like, acrylic resins, cyclic olefin polymer (COP), cellulose ester resins including triacetylcellulose (TAC), polyvinyl acetate, polyvinyl chloride (PVC), polynorbornene resins, polycarbonate resins (PC), polyamide resins, polyacetal resins, polyphenylene ether resins, polyphenylene sulfide resins, polysulfone resins, polyether sulfone resins, polyacrylate resins, and polyimide resins. In an embodiment, the first protective layer includes a film formed of a polyester resin. The first protective layer may include a film formed of the resin subjected to modification. Here, modification may include copolymerization, branching, crosslinking, and modification of molecular terminals, without being limited thereto.

In an embodiment, although not shown in FIG. 1, the first protective film may include a base film and a primer layer formed on at least one surface of the base film. The base film supports the first protective layer and has a certain range of ratio of refractive index with respect to the primer layer to increase transmittance of the base layer. In an embodiment, a ratio of index of refraction of the primer layer to that of the base film (index of refraction of primer layer/index of refraction of base film) may be about 1.0 or less, and, in an embodiment, about 0.6 to about 1.0, and, in an embodiment, about 0.69 to about 0.95, and, in an embodiment, about 0.7 to about 0.9, and, in an embodiment, about 0.72 to about 0.88. Within this range, the base layer can improve transmittance of the first protective layer. In an embodiment, the base film may have an index of refraction of about 1.3 to about 1.7, and, in an embodiment, about 1.4 to about 1.6. Within this range, the base layer can be used in the first protective layer, allow easy control of the index of refraction with respect to the primer layer, and improve transmittance of the first protective layer. The base film may include a film formed of the resin as set forth above. The primer layer is formed between the base layer and the first resin layer and reinforces attachment between the base film and the first resin layer. In an embodiment, the primer layer may have an index of refraction of about 1.0 to about 1.6, and, in an embodiment, about 1.1 to about 1.6, and, in an embodiment, about 1.1 to about 1.5. Within this range, the primer layer can be used for an optical film and has an appropriate index of refraction, as compared with the base film, thereby improving transmittance of the base layer. In an embodiment, the primer layer may have a thickness of about 1 nm to about 200 nm, and, in an embodiment, about 60 nm to about 200 nm. Within this range, the primer layer can be used for an optical film, have an appropriate index of refraction, as compared with the base film, and thus improve transmittance of the base layer without embrittlement. The primer layer may be a non-urethane primer layer free from a urethane group. In an embodiment, the primer layer may be formed of a primer layer composition including a resin or monomer such as polyester, acryl, or the like. The primer layer may have the index of refraction as set forth above by controlling a mixing ratio (for example, a molar ratio) between these monomers. The primer layer composition may further include at least one of additives such as UV absorbers, antistatic agents, defoaming agents, surfactants, and the like.

The polarizing film serves to polarize incident light and may include a polarizer.

In an embodiment, the polarizing film may include a polarizer. The polarizer serves to polarize incident light and may include any typical polarizer known to those skilled in the art. In an embodiment, the polarizer may include a polyvinyl alcohol-based polarizer obtained by uniaxially stretching a polyvinyl alcohol film, or a polyene-based polarizer obtained by dehydrating a polyvinyl alcohol film. In an embodiment, the polarizer may have a thickness of 5 μm to 40 μm. Within this thickness range, the polarizer can be used for an optical display.

In another embodiment, the polarizing film may include a polarizer and a second protective layer formed on at least one surface of the polarizer. The second protective layer can suppress intrusion of moisture into the polarizer while increasing mechanical strength of the polarizing plate. In an embodiment, the second protective layer is formed between the polarizer and the contrast-improving film.

The second protective layer may include at least one of an optically transparent protective film or a protective coating layer.

When the second protective layer is of a protective film type, the second protective layer may include a protective film formed of an optically transparent resin. The protective film may be formed through melting and extrusion of the resin. A process of stretching the resin may be further added. The optically transparent resin may include at least one of the resins set forth above. The protective film may be an optically transparent liquid crystal film.

When the second protective layer is of a protective coating layer type, the second protective layer can provide excellent properties in terms of adhesion to the polarizer, transparency, mechanical strength, thermal stability, moisture blocking, and durability. In an embodiment, the protective coating layer may be formed of an actinic radiation-curable resin composition including an actinic radiation-curable compound and a polymerization initiator. The actinic radiation-curable compound may include at least one of a cationic polymerizable curable compound, a radical polymerizable curable compound, a urethane resin, and a silicone resin. The cationic polymerizable curable compound may be an epoxy compound having at least one epoxy group per molecule, or an oxetane compound having at least one oxetane ring per molecule. The radical polymerizable curable compound may be a (meth)acrylic compound having at least one (meth)acryloyloxy group per molecule. The epoxy compound may include at least one of a hydrogenated epoxy compound, a chain-type aliphatic epoxy compound, an alicyclic epoxy compound, and an aromatic epoxy compound. The radical polymerizable curable compound may realize a protective coating layer having excellent hardness and mechanical strength and high durability. Examples of the radical polymerizable curable compound may include a (meth)acrylate monomer having at least one (meth)acryloyloxy group per molecule and a (meth)acrylate oligomer obtained by reacting at least two functional group-containing compounds and having at least two (meth)acryloyloxy groups per molecule. Examples of the (meth)acrylate monomer may include a monofunctional (meth)acrylate monomer having one (meth)acryloyloxy group per molecule, a bifunctional (meth)acrylate monomer having two (meth)acryloyloxy groups per molecule, and a polyfunctional (meth)acrylate monomer having three or more (meth)acryloyloxy groups per molecule. Examples of the (meth)acrylate oligomer may include a urethane (meth)acrylate oligomer, a polyester (meth)acrylate oligomer, and an epoxy (meth)acrylate oligomer. The polymerization initiator can cure the actinic radiation-curable compound. The polymerization initiator may include at least one of a photocationic initiator and a photosensitizer.

The photocationic initiator may include any typical photocationic initiator known in the art. In an embodiment, the photocationic initiator may include an anium salt including a cation and an anion. In an embodiment, the cation may include diaryl iodonium such as diphenyliodonium, 4-methoxydiphenyliodonium, bis(4-methylphenyl)iodonium, bis(4-tert-butylphenyl)iodonium, bis(dodecylphenyl) iodonium, and (4-methylphenyl)[(4-(2-methylpropyl)phenyl)iodonium; triarylsulfoniums such as triphenylsulfonium and diphenyl-4-thiophenoxyphenylsulfonium; and bis[4-(diphenylsulfonio)phenyl]sulfide. In an embodiment, the anion may include hexafluorophosphate, tetrafluoroborate, hexafluoroantimonate, hexafluoroarsenate, and hexachloroantimonate. The photosensitizer may be any typical photosensitizer known in the art. In an embodiment, the photosensitizer may include at least one selected from thioxanthone, phosphorus, triazine, acetophenone, benzophenone, benzoin, and oxime photosensitizers. The polymerization initiator may be present in an amount of about 0.01 parts by weight to about 10 parts by weight relative to 100 parts by weight of the actinic radiation-curable compound. Within this range, the composition can be sufficiently cured to provide good mechanical strength and adhesion to the polarizer. The actinic radiation-curable resin composition may further include general additives such as silicone leveling agents, UV absorbers, antistatic agents, and the like. In an embodiment, the additives may be present in an amount of about 0.01 parts by weight to about 1 part by weight relative to 100 parts by weight of the actinic radiation-curable compound. The protective coating layer may be a liquid crystal coating layer.

The second protective layer may have the same or different retardation, material, and thickness from the first protective layer.

In an embodiment, the second protective layer may have a thickness of about 5 μm to about 200 μm, and, in an embodiment, about 30 μm to about 120 μm. In an embodiment, the second protective layer of the protective film type may have a thickness of about 50 μm to about 100 μm, and the second protective layer of the protective coating layer type may have a thickness of about 5 μm to about 50 μm. Within this thickness range, the second protective layer can be used for an optical display.

Figure 2:
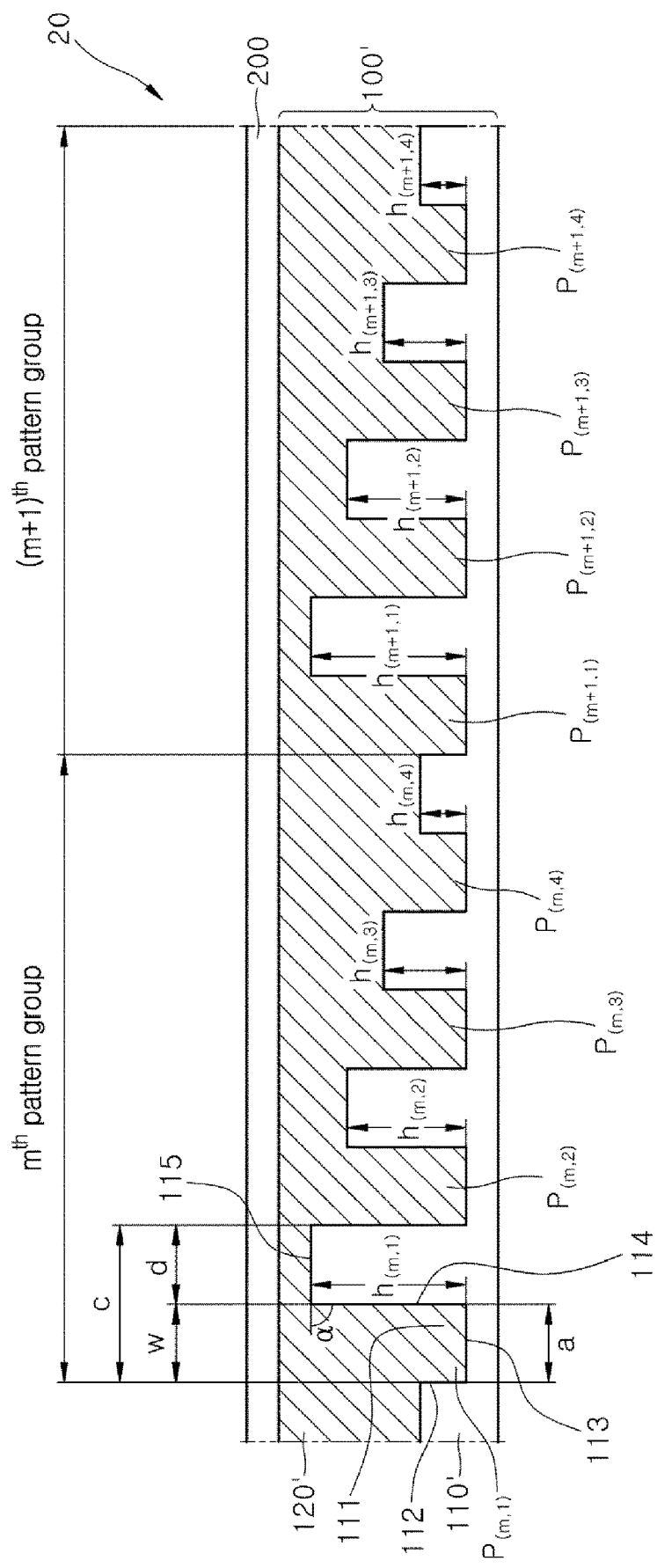
FIG. 2 is a cross-sectional view of an optical film of a polarizing plate according to another embodiment of the present invention.

Next, a polarizing plate according to another embodiment of the present invention will be described with reference to FIG. 2. FIG. 2 is a cross-sectional view of a contrast-improving optical film of a polarizing plate according to another embodiment of the invention.

Referring to FIG. 2, the contrast-improving optical film 20 may include a first protective layer 200 and a contrast-improving layer 100'. The polarizing plate according to this embodiment is substantially the same as the polarizing plate according to the above-described embodiment except that the contrast-improving layer 100' is included instead of the contrast-improving layer 100. The contrast-improving layer 100' includes a first resin layer 110' and a second resin layer 120'.

FIG. 2 shows an $m^{th}$ pattern group and an $(m+1)^{th}$ pattern group adjacent thereto. The $m^{th}$ pattern group and the $(m+1)^{th}$ pattern group may be arranged in the transverse direction of the embossed optical pattern. Here, $2 \leq m+1 \leq n$ (m being an integer).

Referring to FIG. 2, in the $m^{th}$ pattern group, a first optical pattern $P_{(m,1)}$, a second optical pattern $P_{(m,2)}$, a third optical pattern $P_{(m,3)}$, and a fourth optical pattern $P_{(m,4)}$ are sequentially formed in the transverse direction of the optical pattern and a flat section formed between adjacent optical patterns. When the shortest distances between first surfaces of the first to fourth optical patterns and the flat sections adjacent to the first to fourth optical patterns are indicated by $h_{(m,1)}$, $h_{(m,2)}$, $h_{(m,3)}$, and $h_{(m,4)}$, respectively, $h_{(m,1)} > h_{(m,2)} > h_{(m,3)} > h_{(m,4)}$.

The $(m+1)^{th}$ pattern group is a pattern group adjacent to the $m^{th}$ pattern group. In the $(m+1)^{th}$ pattern group, a first optical pattern $P_{(m+1,1)}$, a second optical pattern $P_{(m+1,2)}$, a third optical pattern $P_{(m+1,3)}$, and a fourth optical pattern $P_{(m+1,4)}$ are sequentially formed in the transverse direction of the embossed optical pattern and a flat section is formed between adjacent optical patterns. When the shortest distances between first surfaces of the first to fourth optical patterns and the flat sections adjacent to the first to fourth optical patterns are indicated by $h_{(m+1,1)}$, $h_{(m+1,2)}$, $h_{(m+1,3)}$, and $h_{(m+1,4)}$, respectively, $h_{(m+1,1)} > h_{(m+1,2)} > h_{(m+1,3)} > h_{(m+1,4)}$. In an embodiment, the shortest distance "h" between the first surface 113 of one optical pattern 111 and a flat section 115 adjacent to the optical pattern 111 may be about 40 μm or less, and, in an embodiment, about 30 μm or less, and, in an embodiment, about 4 μm to about 15 μm. Within this range, the polarizing plate can improve the contrast ratio, viewing angle, and brightness of an optical display without causing the Moiré phenomenon.

Referring to FIG. 2, the polarizing plate may include an $m^{th}$ pattern group and an $(m+1)^{th}$ pattern group, wherein, in each of the $m^{th}$ pattern group and the $(m+1)^{th}$ pattern group, when the shortest distances between the first surfaces of first to $i^{th}$ embossed optical patterns and flat sections immediately adjacent to the first to $i^{th}$ embossed optical patterns are sequentially indicated by $h_1, h_2, \ldots, h_i$, respectively, $h_1 > h_2 > \ldots > h_i$. In this way, when used as a viewer-side polarizing plate, the polarizing plate can improve black visibility upon non-operation of an optical display. In an embodiment, at the interface of the first resin layer 110' and the second resin layer 120', the first surfaces 113 of the first resin layer 110' may be collinear with each other. Herein, the expression "the first surfaces of the first resin layer are collinear" means that the distances from the first surfaces to one surface of the contrast-improving layer 100' (a lower-most surface of the contrast-improving layer or an interface between the contrast-improving layer and the first protective layer) are all the same.

Although not shown in FIG. 2, the polarizing plate may further include an $(m+2)^{th}$ pattern group, wherein, also in the $(m+2)^{th}$ pattern group, when the shortest distances between the first surfaces of first to $i^{th}$ embossed optical patterns and flat sections immediately adjacent to the first to $i^{th}$ embossed optical patterns are indicated by $h_1, h_2, \ldots, h_i$, respectively, $h_1 > h_2 > \ldots > h_i$. That is, the polarizing plate according to the present invention may include at least two, for example, three or more, for example, four or more pattern groups in which, when the shortest distances between the first surfaces of first to $i^{th}$ embossed optical patterns and flat sections immediately adjacent to the first to $i^{th}$ embossed optical patterns are sequentially indicated by $h_1, h_2, \ldots, h_i$, respectively, $h_1 > h_2 > \ldots > h_i$.

In another embodiment, although not shown in FIG. 1, the polarizing plate may include pattern groups in which, when the shortest distances between the first surfaces of first to $i^{th}$ embossed optical patterns and flat sections immediately adjacent to the first to $i^{th}$ embossed optical patterns are sequentially indicated by $h_1, h_2, \ldots, h_i$, respectively, $h_1 < h_2 < \ldots < h_i$. That is, contrary to FIG. 2, the polarizing plate according to the present invention may include a contrast-improving optical film satisfying $h_{(m,1)} < h_{(m,2)} < h_{(m,3)} < h_{(m,4)}$ and $h_{(m+1,1)} < h_{(m+1,2)} < h_{(m+1,3)} < h_{(m+1,4)}$. The polarizing plate according to the present invention may include an $m^{th}$ pattern group and an $(m+1)^{th}$ pattern group, wherein, in each pattern group, when the shortest distances between the first surfaces of first to $i^{th}$ embossed optical patterns and flat sections immediately adjacent to the first to $i^{th}$ embossed optical patterns are sequentially indicated by $h_1, h_2, \ldots, h_i$, respectively, $h_1 < h_2 < \ldots < h_i$. In this way, when used as a viewer-side polarizing plate, the polarizing plate can improve black visibility upon non-operation of an optical display.

In accordance with another aspect of the present invention, an optical display may include the polarizing plate according to the present invention. In an embodiment, the optical display may include a liquid crystal display.

The liquid crystal display may include the polarizing plate as a viewer-side polarizing plate with respect to a liquid crystal panel.

In an embodiment, the liquid crystal display may include a backlight unit, a first polarizing plate, a liquid crystal panel, and a second polarizing plate, which are stacked in the stated order, wherein the second polarizing plate may include the polarizing plate according to the present invention. The liquid crystal panel may employ a vertical alignment (VA) mode, an IPS mode, a patterned vertical alignment (PVA) mode, or a super-patterned vertical alignment (S-PVA) mode, without being limited thereto.

Next, the present invention will be described in more detail with reference to some examples. However, it should be noted that these examples are provided for illustration and are not to be construed in any way as limiting the present invention.

Example 1

A UV curable resin (SHIN-A T&C Co., Ltd.) was coated onto one surface of a PET film (thickness: 80 μm, Re=14,000 nm at wavelength of 550 nm, Toyobo Co., Ltd.) for a first protective layer, thereby forming a coating layer. Then, a film having a patterned portion, which included optical patterns having the same base angle at both sides thereof and flat sections formed between adjacent optical patterns, was applied to the coating layer, followed by curing, thereby forming a second resin layer. The second resin layer had an index of refraction of 1.59.

A UV curable resin (SHIN-A T&C Co., Ltd.) was coated onto the second resin layer to form a first resin layer having a filling pattern completely filling the optical patterns, thereby forming a contrast-improving film. The first resin layer had an index of refraction of 1.47.

A polarizer was fabricated by stretching a polyvinyl alcohol film at 60° C. to 3 times an initial length thereof and adsorbing iodine to the stretched film, followed by stretching the film to 2.5 times the stretched length of the film in an aqueous solution of boric acid at 40° C.

With a bonding agent for polarizing plates (Z-200, Nippon Goshei) applied to both surfaces of the prepared polarizer, a COP film (ZEON Corporation) was bonded to one surface of the polarizer and a PET film (thickness: 80 μm, Toyobo Co., Ltd.) was bonded to the other surface thereof.

An acryl resin adhesive was applied to one surface of the first resin layer of the contrast-improving film, and the PET film bonded to the polarizer was attached to the adhesive, thereby fabricating a polarizing plate.

The contrast-improving layer of the polarizing plate had a cross-sectional shape as shown in FIG. 1. Specifically, the contrast-improving layer included embossed optical patterns each having a trapezoidal cross-sectional shape (both base angles α: 86°, width of a first surface: 7 μm). Each pattern group included three optical patterns and flat sections formed between adjacent optical patterns. Each of the flat sections had a width d of 7 μm. Each of the optical patterns had a pitch c of 14 μm and a width w of 7 μm. In each pattern group, the maximum value and minimum value among the shortest distances between the first surfaces of the optical patterns and the flat sections adjacent to the respective optical patterns were 12 μm and 4 μm, respectively. When the shortest distances between the first surfaces of the first to third optical patterns and the flat sections adjacent to the first to third optical patterns were indicated by $h_{(m,1)}$, $h_{(m,2)}$, and $h_{(m,3)}$, respectively, $h_{(m,1)} > h_{(m,2)} > h_{(m,3)}$.

Example 2

A polarizing plate was fabricated in the same manner as in Example 1 except that a contrast-improving layer having the following parameters was formed.

The contrast-improving layer of the polarizing plate had a cross-sectional shape as shown in FIG. 1. Specifically, the contrast-improving layer included embossed optical patterns each having a trapezoidal cross-sectional shape (both base angles α: 86°, width of a first surface: 7 μm). Each pattern group included three optical patterns and flat sections formed between adjacent optical patterns. Each of the flat sections had a width d of 7 μm. Each of the optical patterns had a pitch c of 14 μm and a width w of 7 μm. In each pattern group, the maximum value and minimum value among the shortest distances between the first surfaces of the optical patterns and the flat sections adjacent to the respective optical patterns were 9 μm and 4 μm, respectively. When the shortest distances between the first surfaces of the first to third optical patterns and the flat sections adjacent to the first to third optical patterns were indicated by $h_{(m,1)}$, $h_{(m,2)}$, and $h_{(m,3)}$, respectively, $h_{(m,1)} > h_{(m,2)} > h_{(m,3)}$.

Example 3

A polarizing plate was fabricated in the same manner as in Example 1 except that a contrast-improving layer having the following parameters was formed.

The contrast-improving layer of the polarizing plate had a cross-sectional shape as shown in FIG. 2. Specifically, the contrast-improving layer included embossed optical patterns each having a trapezoidal cross-sectional shape (both base angles α: 86°, width of a first surface: 7 μm). Each pattern group included three optical patterns and flat sections formed between adjacent optical patterns. Each of the flat sections had a width d of 7 μm. Each of the optical patterns had a pitch c of 14 μm and a width w of 7 μm. In each pattern group, the maximum value and minimum value among the shortest distances between the first surfaces of the optical patterns and the flat sections adjacent to the respective optical patterns were 12 μm and 4 μm, respectively. When the shortest distances between the first surfaces of the first to third optical patterns and the flat sections adjacent to the first to third optical patterns were indicated by $h_{(m,1)}$, $h_{(m,2)}$, and $h_{(m,3)}$, respectively, $h_{(m,1)} > h_{(m,2)} > h_{(m,3)}$.

Example 4

A polarizing plate was fabricated in the same manner as in Example 1 except that a contrast-improving layer having the following parameters was formed.

The contrast-improving layer of the polarizing plate had a cross-sectional shape as shown in FIG. 2. Specifically, the contrast-improving layer included embossed optical patterns each having a trapezoidal cross-sectional shape (both base angles α: 86°, width of a first surface: 7 μm). Each pattern group included three optical patterns and flat sections formed between adjacent optical patterns. Each of the flat sections had a width d of 7 μm. Each of the optical patterns had a pitch c of 14 μm and a width w of 7 μm. In each pattern group, the maximum value and minimum value among the shortest distances between the first surfaces of the optical patterns and the flat sections adjacent to the respective optical patterns were 9 μm and 4 μm, respectively. When the shortest distances between the first surfaces of the first to third optical patterns and the flat sections adjacent to the first to third optical patterns were indicated by $h_{(m,1)}$, $h_{(m,2)}$, and $h_{(m,3)}$, respectively, $h_{(m,1)} > h_{(m,2)} > h_{(m,3)}$.

Comparative Example 1

A polarizing plate was fabricated in the same manner as in Example 1 except that the second resin layer was changed as follows.

The contrast-improving layer included embossed optical patterns each having a trapezoidal cross-sectional shape (both base angles α: 86°, width of a first surface: 7 μm). Flat sections were formed between adjacent optical patterns. Each of the flat sections had a width d of 7 μm. Each of the optical patterns had a pitch c of 14 μm and a width w of 7 μm. In each pattern group, the shortest distances between the first surfaces of the optical patterns and the flat sections adjacent to the respective optical patterns were all the same (7 μm).

Modules for liquid crystal displays were fabricated using the polarizing plates of the Examples and Comparative Example.

Preparative Example 1: Fabrication of First Polarizing Plate

A first polarizer was prepared by stretching a polyvinyl alcohol film to 3 times an initial length thereof at 60° C., and adsorbing iodine to the stretched film, followed by stretching the film to 2.5 times the stretched length of the film in an aqueous solution of boric acid at 40° C. As a base layer, a triacetylcellulose film (thickness: 80 μm) was bonded to both surfaces of the first polarizer using a bonding agent for polarizing plates (Z-200, Nippon Goshei Co., Ltd.), thereby fabricating a first polarizing plate.

Preparative Example 2: Fabrication of Module for Liquid Crystal Displays

The first polarizing plate of Preparative Example 1, a liquid crystal panel (PVA mode), and each of the polarizing plates prepared in the Examples and Comparative Example were assembled in the stated order, thereby fabricating a module for liquid crystal displays. Each of the polarizing plates fabricated in the Examples and Comparative Example was used as a viewer-side polarizing plate.

Figure 3:
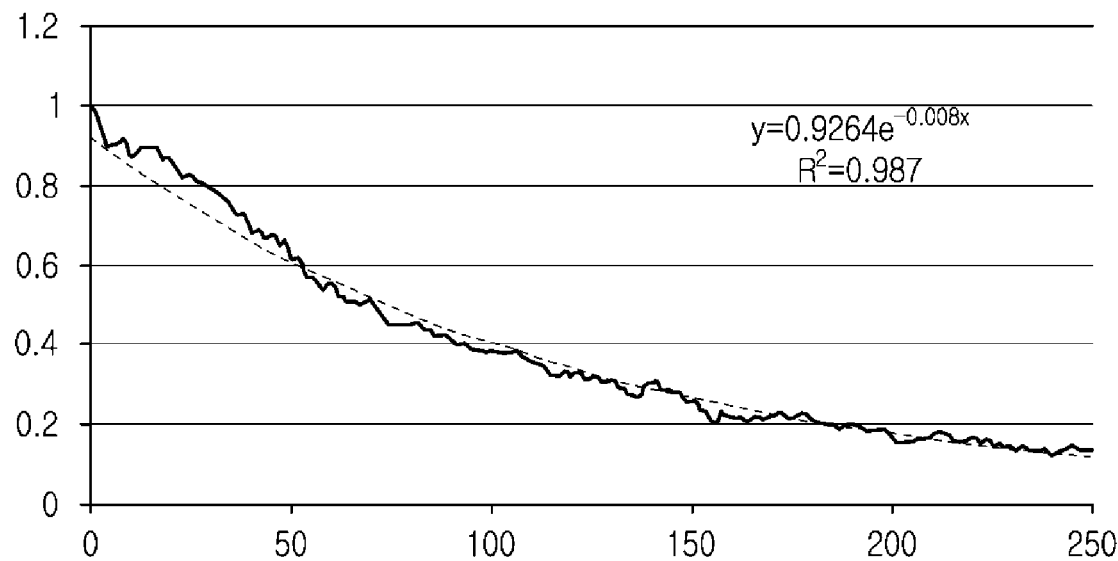
FIG. 3 is a graph for calculation of determination coefficient of black visibility upon non-operation of an optical display of an example of the present invention.
Figure 4:
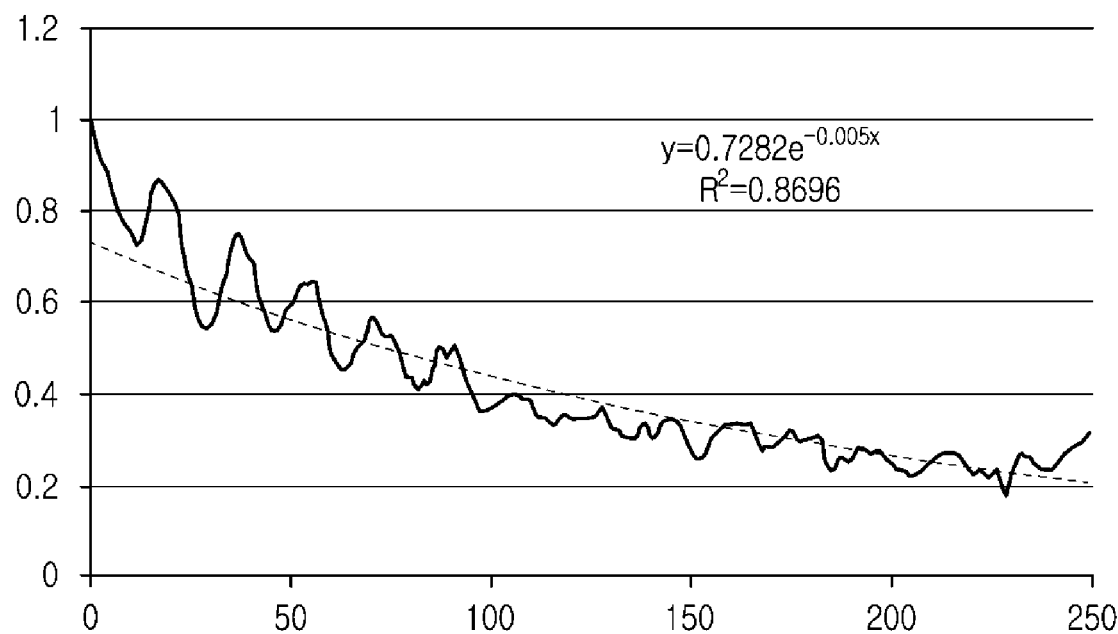
FIG. 4 is a graph for calculation of determination coefficient of black visibility upon non-operation of an optical display of a comparative example.

Schematic features of the modules for liquid crystal displays are shown in Table 1. Each of the modules for liquid crystal displays fabricated using the polarizing plates of the Examples and Comparative Example was evaluated as to the following properties and evaluation results are shown in Table 1, FIG. 3, and FIG. 4.

of the measured reflected light (reflected light in pixel unit 0) to obtain a squared value in each pixel. A graph was obtained by arranging pixel unit locations on the x-axis and the obtained squared values on the y-axis, and was normalized by a statistical analysis method. From normalization, a trend line and residuals of an exponential function ($y=ae^{bx}$) were obtained. The residuals were used as the determination coefficient of black visibility. FIG. 3 is a graph for calculation of determination coefficient of black visibility upon non-operation of the optical display of Example 1, in which the pixel locations are indicated by the x-axis and the squared values are indicated by the y-axis. In FIG. 3, a solid line indicates the squared values depending upon the pixel locations, and a black line indicates the normalized values. A determination coefficient of black visibility approaching 1 indicates better external appearance, and a lower determination coefficient of black visibility means larger fluctuation of the intensity of reflected light providing apparent diffraction light. FIG. 4 is a graph for calculation of determination coefficient of black visibility upon non-operation of the optical display of Comparative Example 1.

TABLE 1

|  | Example 1 | Example 2 | Example 3 | Example 4 | Comparative Example 1 |
|---|---|---|---|---|---|
| Base angle (°) | 86 | 86 | 86 | 86 | 86 |
| Width of first surface (a, μm) | 7 | 7 | 7 | 7 | 7 |
| Cross-section | Trapezoid | Trapezoid | Trapezoid | Trapezoid | Trapezoid |
| Width of flat section (d, μm) | 7 | 7 | 7 | 7 | 7 |
| Pitch (c, μm) | 14 | 14 | 14 | 14 | 14 |
| Maximum value of h (μm) | 12 | 9 | 12 | 9 | 7 |
| Minimum value of h (μm) | 4 | 4 | 4 | 4 | 7 |
| Pattern shape | FIG. 1 | FIG. 1 | FIG. 2 | FIG. 2 | Having the same h |
| Aspect ratio* | 1.71 | 1.29 | 1.71 | 1.29 | 1 |
| Side contrast ratio upon operation (0°, 60°) | 100 | 100 | 100 | 100 | 100 |
| Determination coefficient of black visibility upon non-operation | 0.9870 | 0.9821 | 0.9868 | 0.9815 | 0.8696 |

*Aspect ratio: Aspect ratio of an embossed optical pattern having the largest height in the pattern group.

(1) Side contrast ratio upon operation: A liquid crystal display was fabricated as described above. Contrast ratio of the liquid crystal display was measured in a spherical coordinate system (0°, 60°) using an EZCONTRAST X88RC (EZXL-176R-F422A4, ELDIM Inc.).

(2) Evaluation of external appearance upon non-operation: A liquid crystal display was fabricated as described above. A reflection image was photographed by turning on a three-wavelength fluorescent lamp (OSRAM) placed at a height of 30 cm above the viewer-side polarizing plate. The three-wavelength fluorescent lamp was placed corresponding to the middle location on the screen of the liquid crystal display in the longitudinal direction. The intensity (I) of the reflected light was measured in pixel units using an image analysis program (ImageJ). When the outermost periphery of the three-wavelength fluorescent lamp was defined as pixel unit 0, the screen of the liquid crystal display was partitioned into a total of 250 pixels from pixel unit 0 in the longitudinal direction.

The intensity (I) of the reflected light measured on each pixel was divided by the maximum value of the intensity (I)

As shown in Table 1 and FIG. 3, the polarizing plates of the Examples had a high determination coefficient of black visibility of 0.98 or more upon non-operation and thus could prevent or substantially prevent deterioration in appearance of an optical display due to external light upon non-operation of the optical display. Therefore, it can be seen that the polarizing plate according to the present invention can prevent or substantially prevent generation of mura on a screen of an optical display due to external light while improving black visibility upon non-operation of the optical display. In addition, the polarizing plate according to the present invention can improve the front contrast ratio and side contrast ratio of an optical display or can improve the side contrast ratio while reducing or minimizing reduction in the front contrast ratio upon operation of the optical display.

Conversely, the polarizing plate of Comparative Example 1, in which, in each pattern group, the shortest distances h between the first surfaces of the embossed optical patterns and the flat sections adjacent to the respective embossed optical patterns were all the same, had a determination coefficient of black visibility of 0.8696 upon non-operation and thus could not sufficiently prevent deterioration in appearance of an optical display due to external light upon non-operation of the optical display.

It should be understood that various modifications, changes, alterations, and equivalent embodiments can be made by those skilled in the art without departing from the spirit and scope of the present invention.

What is claimed is:

1. A polarizing plate, comprising:
a polarizing film; and
an optical film on a surface of the polarizing film, the optical film comprising a first resin layer and a second resin layer sequentially stacked on the polarizing film,
wherein the second resin layer has a higher index of refraction than the first resin layer,
a plurality of pattern groups is at an interface between the first resin layer and the second resin layer, each of the pattern groups comprising at least two embossed optical patterns protruding from the second resin layer and a flat section formed between adjacent embossed optical patterns,
the flat sections or first surfaces of the embossed optical patterns are collinear at the interface between the first resin layer and the second resin layer, each of the first surfaces being a bottom portion of each of the embossed optical patterns, and,
in each pattern group, shortest distances between the first surfaces of the embossed optical patterns and the flat sections immediately adjacent to the embossed optical patterns are sequentially increased, or sequentially decreased.

2. The polarizing plate according to claim 1, wherein the flat sections are collinear with each other.

3. The polarizing plate according to claim 1, wherein the first surfaces of the embossed optical patterns are collinear with each other.

4. The polarizing plate according to claim 3, wherein the pattern groups comprise an $m^{th}$ pattern group and an $(m+1)^{th}$ pattern group, wherein, in the $m^{th}$ pattern group, the shortest distances are sequentially decreased, and in the $(m+1)^{th}$ pattern group, the shortest distances are sequentially decreased, respectively.

5. The polarizing plate according to claim 3, wherein the pattern groups comprise an $m^{th}$ pattern group and an $(m+1)^{th}$ pattern group, wherein, in the $m^{th}$ pattern group, the shortest distances are sequentially increased, and in the $(m+1)^{th}$ pattern group, the shortest distances are sequentially increased, respectively.

6. The polarizing plate according to claim 3, wherein, in each pattern group, a ratio of a maximum value to a minimum value among heights of the embossed optical patterns is greater than about 1 and less than about 5.

7. The polarizing plate according to claim 3, wherein the pattern groups comprise an $m^{th}$ pattern group and an $(m+1)^{th}$ pattern group and a maximum height of an $i^{th}$ optical pattern in the $m^{th}$ pattern group is the same as or different from a maximum height of an $i^{th}$ optical pattern in the $(m+1)^{th}$ pattern group, i being an integer from 1 to 10.

8. The polarizing plate according to claim 2, wherein the pattern groups comprise an $m^{th}$ pattern group and an $(m+1)^{th}$ pattern group, wherein, in the $m^{th}$ pattern group, the shortest distances are sequentially decreased, and in the $(m+1)^{th}$ pattern group, the shortest distances are sequentially decreased, respectively.

9. The polarizing plate according to claim 2, wherein the pattern groups comprise an $m^{th}$ pattern group and an $(m+1)^{th}$ pattern group, wherein, in the $m^{th}$ pattern group, the shortest distances are sequentially increased, and in the $(m+1)^{th}$ pattern group, the shortest distances are sequentially increased, respectively.

10. The polarizing plate according to claim 2, wherein, in each pattern group, a ratio of a maximum value to a minimum value among heights of the embossed optical patterns is greater than about 1 and less than about 5.

11. The polarizing plate according to claim 2, wherein the pattern groups comprise an $m^{th}$ pattern group and an $(m+1)^{th}$ pattern group and a maximum height of an $i^{th}$ optical pattern in the $m^{th}$ pattern group is the same as or different from a maximum height of an $i^{th}$ optical pattern in the $(m+1)^{th}$ pattern group, i being an integer from 1 to 10.

12. The polarizing plate according to claim 1, wherein each of the first surfaces is a planar surface.

13. The polarizing plate according to claim 1, wherein each of the embossed optical patterns has a rectangular, square, or trapezoidal cross-sectional shape.

14. The polarizing plate according to claim 1, wherein, in each pattern group, a pitch is greater than 1 to about 5 times a maximum width of the embossed optical pattern.

15. The polarizing plate according to claim 1, wherein a difference in index of refraction between the second resin layer and the first resin layer is about 0.3 or less.

16. The polarizing plate according to claim 1, wherein the embossed optical patterns protrude from the second resin layer in an opposite direction with respect to a light exiting direction of the polarizing film.

17. The polarizing plate according to claim 1, wherein an aspect ratio of an embossed optical pattern having the largest height in each pattern group is greater than about 0.3 and less than or equal to about 3.

18. The polarizing plate according to claim 1, further comprising a first protective layer on a surface of the second resin layer.

19. An optical display comprising the polarizing plate according to claim 1.

20. The optical display according to claim 19, wherein the flat sections are collinear with each other.

* * * * *